United States Patent

[11] 3,622,070

| [72] | Inventor | Andrew H. Sawyer<br>Pittsburgh, Pa. |
|---|---|---|
| [21] | Appl. No. | 885,887 |
| [22] | Filed | Dec. 17, 1969 |
| [45] | Patented | Nov. 23, 1971 |
| [73] | Assignee | H. H. Robertson Company<br>Pittsburgh, Pa. |

[54] DUAL VOLUME AIR DISTRIBUTION APPARATUS
7 Claims, 5 Drawing Figs.

[52] U.S. Cl. ..................................... 236/13, 236/38, 236/1 C
[51] Int. Cl. ..................................... Go5g 23/13, F24f 11/04
[50] Field of Search ........................ 236/13, 38, 1 C; 137/90, 607, 604, 605, 606; 165/16, 29

[56] References Cited
UNITED STATES PATENTS

| 2,729,429 | 1/1956 | Goemann | 236/1 C |
| 2,957,628 | 10/1960 | Curran | 236/13 |
| 3,026,041 | 3/1962 | Jentoft | 236/13 |
| 3,053,454 | 9/1962 | Waterfill | 137/606 X |
| 3,084,711 | 4/1963 | Phillips | 137/607 X |
| 3,237,860 | 3/1966 | Jentoft | 236/13 X |
| 3,368,752 | 2/1968 | Marshall | 236/13 X |

*Primary Examiner*—William F. O'Dea
*Assistant Examiner*—Thomas R. Hampshire
*Attorneys*—Harry B. Keck and George E. Manias ABSTRACT: Apparatus which receives separate streams of hot and cold air and distributes a conditioning stream to a zone of a building which is to be conditioned. Thermostatic means within the zone generates a theremostatic control signal proportional to the instantaneous temperature within the zone. Over a first range of theremostatic control signals, control elements within the apparatus cooperate to discharge the conditioning stream at a constant box flow rate. Over a second range of thermostatic control signals which includes signals beyond the first range, the control elements cooperate to discharge the conditioning stream at flow rates above the constant box flow rate and at a constant temperature.

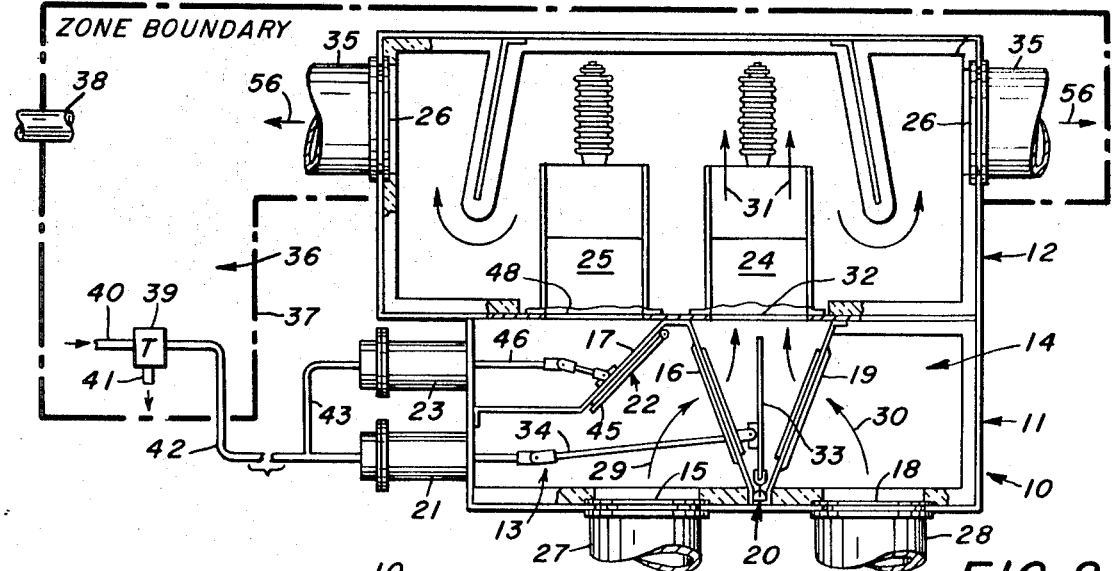
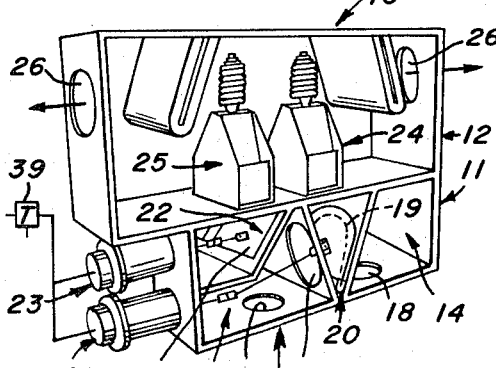
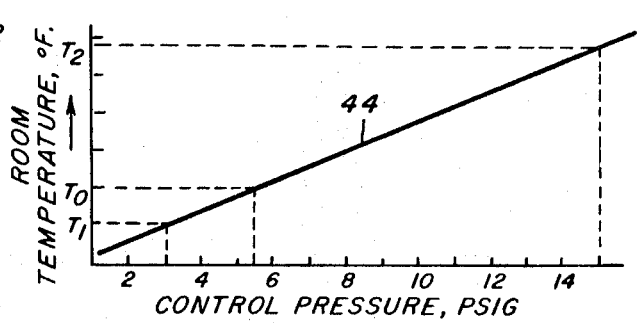
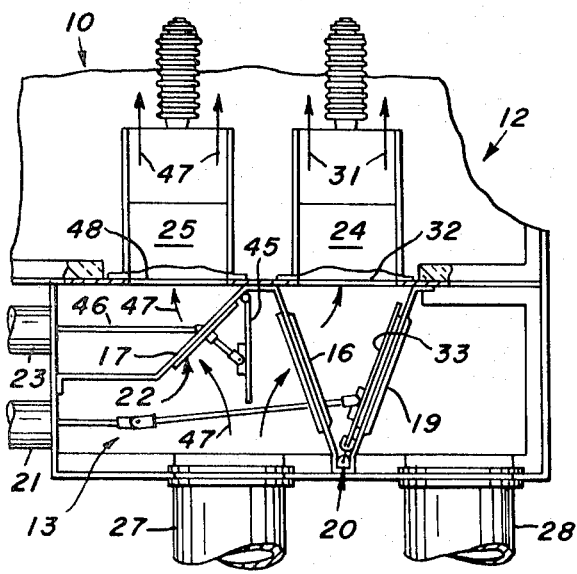
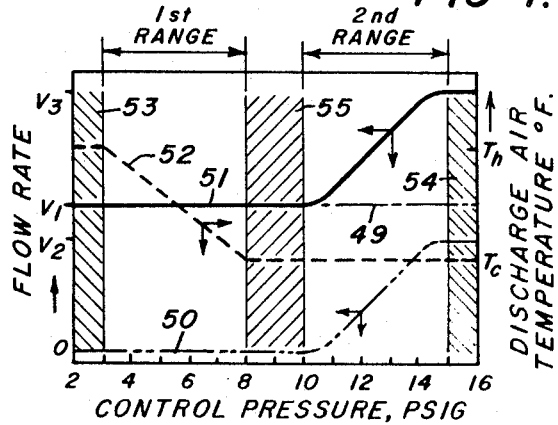
FIG. 2.
FIG. 1.
FIG. 4.
FIG. 3.
FIG. 5.
INVENTOR.
ANDREW H. SAWYER
BY George E. Manias
AGENT

DUAL VOLUME AIR DISTRIBUTION APPARATUS

BACKGROUND OF THE INVENTION

1. Field of the Invention

This invention relates to a high pressure air-conditioning system and more particularly to a terminal unit in such system, capable of variable temperature/constant volume discharge of a conditioning stream and capable of constant temperature/variable volume discharge of the conditioning stream.

2. Description of the Prior Art

Air-distributing apparatus is known in the prior art which is capable of variable temperature/constant volume discharge of a conditioning stream. Such apparatus incorporates a mixing valve for blending separate hot and cold airstreams to provide a conditioning stream consisting of (a) only the cold airstream, (b) only the hot airstream or (c) a mixture of the two streams. Flow control means is provided downstream of the mixing valve means to maintain the volume flow of the conditioning stream essentially constant. Such apparatus is capable of variable temperature/constant volume operation. See for example U.S. Pat. Nos. 3,053,454; 3,145,296; 3,395,633.

Air-distributing apparatus also is known wherein separate ducts introduce separate air input streams to the apparatus. During the heating season (winter) one duct conveys cold air and the other duct conveys hot air. During the cooling season (summer) both ducts convey cold air. Thus, such apparatus requires a seasonal changeover operation at the central air-conditioning station and at the individual air-distributing units. Such apparatus is capable of variable temperature/constant volume operation during the heating season and constant temperature/variable volume operation during the cooling season, see for example U.S. Pat. No. 2,883,111.

A further prior art air-distributing apparatus is known which employs single mixing valve means for reciprocally blending separate hot and cold input airstreams to provide a single conditioning stream, and two constant volume flow control devices which control the volume of the single conditioning stream. All of the input air (hot and cold) passes through the single mixing valve means. One of the constant volume flow control devices is preset to provide a selected constant flow rate therethrough. The second constant volume flow control device is adjusted by a pneumatic operator which in turn is thermostatically operated. The second flow control device provides additional cooling air. When the second control device is at full flow, a selected maximum flow rate is discharged from the apparatus. Flow rates above the selected constant and below the selected maximum can not be accurately controlled.

The present invention concerns improvements over the latter type of prior art air-distributing apparatus.

SUMMARY OF THE INVENTION

The principal object of this invention is to provide an improved air-distributing apparatus of the type capable of variable temperature/constant volume operation and constant temperature/variable volume operation.

A further object of this invention is to provide an improved air-distributing apparatus capable of providing additional cooling air during peak cooling requirements without the need for seasonal changeover operations.

Still another object of this invention is to provide an improved air-distributing apparatus of the type employing two distinct flow control devices one of which operates continuously to provide a principal stream of air at a constant flow rate and the other of which operates only when required to provide added cooling air at a flow rate which varies from zero to the full capacity of the second flow control device.

In accordance with the present invention, the mixing box is provided with first and second distinct compartments. The first compartment has a cold air inlet and two first compartment outlets. The second compartment has a hot air inlet and one second compartment outlet. The cold and hot airstreams from one of the first compartment outlets and the second compartment outlet respectively, are reciprocally blended by thermostatically controlled first valve means and delivered as a principal stream comprising (a) only hot air, (b) a mixture of cold air and hot air, or (c) only cold air, to the air-mixing chamber. The flow rate of the principal stream is maintained essentially constant by a first flow control means. During peak cooling requirements, the first valve means delivers only cold air to the air-mixing chamber. At that time, thermostatically controlled second valve means is actuated to deliver a supplementary stream of cold air through the other of the first compartment outlets to a second flow control device. The second flow control device limits flow rate of the supplementary stream of cold air to a selected maximum flow rate. However, the flow rate of the supplementary stream of cold air may vary from zero to the selected maximum flow rate.

During normal heating and cooling requirements, the present mixing box discharges conditioning air at a constant flow rate—the temperature of the conditioning air varying from a maximum corresponding to the hot air input temperature to a minimum corresponding with cold air input temperature. However, during peak cooling requirements—when the cooling requirements are not satisfied by the constant flow rate—the second valve means is actuated to deliver a supplementary stream of cold air at a flow rate corresponding to a thermostatic control signal generated by a room thermostat. It is to be noted that during peak cooling requirements, the first flow control means continues to discharge cold air at the selected constant flow rate. The flow rate of the supplementary stream of cold air is added to the selected constant flow rate to achieve a greater total volume flow of cold conditioning air to the zone to satisfy the cooling requirements.

BRIEF DESCRIPTION OF THE DRAWINGS

FIG. 1 is a perspective view of the present mixing box with the cover removed to show internal details;

FIG. 2 is a side view of the present mixing box, with cover removed, and also illustrating a typical building room having air outlet means;

FIG. 3 is a fragmentary side view, similar to FIG. 2, of the present mixing box;

FIG. 4 is a graph illustrating the relationship between room temperature as sensed by room thermostat means and control pressure used to operate valve means within the present mixing box; and FIG. 5 is a graph illustrating the performance of the present mixing box.

DESCRIPTION OF THE PREFERRED EMBODIMENT(S)

FIG. 1 illustrates an air-mixing box 10 of this invention. In general, the mixing box 10 includes an air-receiving chamber 11 and an air-mixing chamber 12 which is isolated from the chamber 11.

The air-receiving chamber 11 includes a first compartment 13 and a second compartment 14 which is isolated from the compartment 13. The first compartment 13 includes one inlet opening 15 and two first compartments gasketed outlets 16, 17. The second compartment 14 includes one inlet opening 18 and one second compartment gasketed outlet 19. First or proportioning valve means 20 is operatively associated with the gasketed outlets 16, 19 and is operated by a first valve operating means 21. Second valve means 22 is operatively associated with the gasketed outlet 17 and is operated by a second valve operating means 23.

The air-mixing chamber 12 includes first flow control means 24 which is positioned between the first valve means 20 and the air-mixing chamber 12; and second flow control means 25 which is positioned between the second valve means 22 and the air-mixing chamber 12. The air-mixing chamber 12 is provided with one or more outlet opening 26.

Referring to FIG. 2, first and second conduit means 27, 28 communicate with the first and second compartment inlet openings 15, 18 respectively. A stream 29 of relatively cool air is provided through the first conduit means 27 from a source of cool air (not illustrated) at a temperature ranging from about 50° F. to about 70° F. A stream 30 of relatively hot air is provided through the second conduit means 28 from a source of hot air (not illustrated) at a temperature ranging from about 70° F. to about 125° F. The cold and hot airstreams 29, 30 are reciprocally blended by the first valve means 20 to provide a principal stream 31 of blended air which flows through a partition opening 32 into the first flow control means 24.

The first valve means 20 may comprise that air mixing valve described and illustrated in copending U.S. Pat. application Ser. No. 787,935, filed Dec. 30, 1968 and assigned to the assignee of this invention. Essentially, the first valve means comprises a damper 33 which is pivotal toward and away from engagement with the opposed gasketed outlets 16, 19. The first valve operating means 21, acting through linkage means 34, positions the damper 33 relative to the opposed gasketed outlets 16, 19. The position of the damper 33 determines the proportion of hot and cold air flowing through the partition opening 32. That is, the damper 33 is pivotal between a first extreme position (engaged with the gasketed outlet 19) wherein the flow of hot air is substantially terminated and essentially only cold air is delivered to the air-mixing chamber 12, and a second extreme position (engaged with the gasketed outlet 16) wherein the flow of cold air through the proportioning valve means 20 is substantially terminated and essentially only hot air is delivered to the air-mixing chamber 12. The principal stream 31 may comprise (a) only hot air, (b) a mixture of cold air and hot air, or (c) only cold air. As will be more fully described later in the specification, the first valve operating means 21 and hence the damper 33 are thermostatically controlled.

The first flow control means 24 may comprise that flow control unit described and illustrated in U.S. Pat. No. 2,890,716. Essentially, the flow control unit 24 is responsive to upstream pressures of the combined hot and cold airstreams 29, 30 being discharged from the first valve means 20. The first flow control means 24 maintains the flow rate of the principal stream 31 essentially constant.

The principal stream 31 flows into the mixing chamber 12 to the outlet openings 26, through discharge conduit means 35 for distribution as a conditioning stream 56 to a zone of a building to be conditioned. A typical building room or zone 36 having boundaries 37 (indicated by the broken line) is schematically illustrated in FIG. 2. An air outlet conduit 38 extends outwardly from the interior of the zone 36 to permit removal of accumulated air from the zone.

A thermostat 39 is provided within the zone 36 for sensing the temperature therein and for generating a corresponding thermostatic control signal. The thermostat 39 may comprise a pneumatically operated thermostat in which case a pneumatic supply conduit 40 delivers a pneumatic impulse to the thermostat 39. The thermostat 39 bleeds a portion of the pneumatic impulse from the supply conduit 40 through the bleed conduit 41 according to the temperature existing within the zone 36 as sensed by the thermostat 39. The remaining pneumatic impulse is delivered as a thermostatic control signal through a thermostatic signal conduit 42 to the first valve operating means 21 and through thermostatic signal branch conduit 43 to the second valve operating means 23.

In this embodiment, the thermostat 39 is a direct acting thermostat wherein the thermostatic control signal (identified as control pressure in FIG. 4) is directly proportional to the room temperature as sensed by the thermostat 39. Alternatively, the thermostat 39 may comprise a reverse acting thermostat in which case the thermostatic control signal would be inversely proportional to the room temperature as sensed by the thermostat 39. In FIG. 4, the solid line 44 represents the thermostatic control signal (control pressure) generated by the thermostat 39 (FIG. 2) as a function of room temperature. $T_o$ represents the set point of the thermostat 39 and corresponds to a control pressure of 5.5 p.s.i.g. $T_1$ and $T_2$ represent room temperatures below and above the set point $T_o$ and correspond to control pressures of 3 and 15 p.s.i.g. respectively.

Referring to FIGS. 2 and 3, the second valve means 22 comprises a damper 45 which is pivotal toward and away from engagement with the gasketed outlet 17. The second valve-operating means 23 acting through linkage means 46, positions the damper 45 in response to thermostatic control signals received through the branch conduit 43 (FIG. 2). When an appropriate thermostatic control signal is received, the damper 45 is pivoted away from the gasketed openings 17, as shown in FIG. 3. At that time, a supplementary stream 47 of cold air is provided which flows through a second partition opening 48 into the second flow control means 25.

The second flow control means 25 may comprise that control unit described and illustrated in U.S. Pat. No. 2,890,716. Essentially, the second flow control unit 25 is responsive to upstream pressures of the supplementary stream 47 of cold air. In this instance, however, the second flow control means 25 limits the flow rate of the supplementary stream 47 to a selected maximum flow rate. Thus, when the damper 45 is closed as shown in FIG. 2, the flow rate of the supplementary stream 47 will be essentially zero. When the damper 45 is at its fully opened position as illustrated in FIG. 3, the flow rate of the supplementary stream 47 will be limited to the selected maximum flow rate. When the damper 45 is at intermediate positions, the flow rate of the supplementary stream 47 will have a value between zero and the selected maximum flow rate.

FIG. 5 illustrates the operation of the present mixing box 10. The dash-dot line 49 represents the flow rate of the principal stream 31 as a function of control pressure. It will be observed that the flow rate of the principal stream 31 as a function of control pressure. It will be observed that the flow rate of the principal stream 31 indicated at $V_1$, remains constant throughout the entire range of control pressures.

The selected maximum flow rate of the supplementary stream 47 is indicated at $V_2$. The dash-dot-dot line 50 represents the flow rate of the supplementary stream 47 as a function of control pressure.

The solid line 51 represents the flow rate of the conditioning stream 56 (FIG. 1) as a function of control pressure. It will be observed that the flow rate of the conditioning stream 56 varies between the constant box flow rate $V_1$ and a maximum box flow rate $V_3$. It should be noted that below a control pressure of 10 p.s.i.g., the conditioning stream 56 consists of the principal stream 31; and that above a control pressure of 10 p.s.i.g., the conditioning stream 56 consists of the principal stream 31 and the supplementary stream 47.

The right-hand ordinate corresponds to the temperature of the air being discharged through the discharge conduits 35 (FIG. 2). $T_c$ represents the temperature of the cold air inlet stream 19 and $T_h$ represents the temperature of the hot air inlet stream 30. The broken line 52 represents the temperature of the air being discharged as a function of control pressure.

It will be observed in FIG. 5 that below a thermostatic control signal of 3 p.s.i.g. (shaded area 53), only hot air (principal stream 31) at the temperature $T_h$ and at the constant box flow rate $V_1$, is discharged from the mixing box 10. Above a thermostatic control signal of 15 p.s.i.g. (shaded area 54), only cold air (principal steam 31 and supplementary stream 47) at a temperature $T_c$ and at the maximum box flow rate $V_3$, is discharged from the mixing box 10.

Referring to FIGS. 2 and 5, the first valve operating means 21 and hence the first valve means 20, are responsive to a first range (3–8 p.s.i.g.) of thermostatic control pressures. Over the first range, the first valve operating means 21 delivers the principal stream 31 as (a) only hot air, (b) a mixture of hot air and cold air, or (c) only cold air (see temperature curve 52 of FIG. 5), and at a constant flow rate which corresponds to the constant box flow rate $V_1$.

The second valve operating means 23 and hence a second valve means 22 are responsive to a second range (10-15 p.s.i.g.) of thermostatic control pressures. Over the second range, the first valve means 20 delivers the principal stream 31 as cold air and at constant flow rate $V_1$; and the second valve means 22 delivers the supplementary stream 47 of cold air at a flow rate between zero and the selected maximum flow rate $V_2$. Thus, over the first range of thermostatic control pressures, the first valve means 20 and the first flow control means 24 provide variable temperature/constant volume operation of the mixing box. Over the second range of thermostatic control pressures, the first and second valve means 20, 22 and the first and second flow control means 24, 25 provide constant temperature/variable volume operation of the mixing box 10.

It will be observed in FIG. 5 that the first range of thermostatic control signals is distinct from the second range of thermostatic control signals. The first range is separated from the second range by an intermediate range (shaded area 55) corresponding to thermostatic control pressures of 8-10 p.s.i.g. Over the intermediate range 55, only cold air (principal stream 31) at a temperature $T_c$ and at the constant flow rate $V_1$, is discharged from the mixing box 10. The intermediate range 55 provides "play" in the system between full closing of the hot air and activation of the second valve means 22. However, depending on the load requirements of the zone being conditioned, the intermediate range may be eliminated and the first and second ranges be arranged to abut or overlap.

I claim:

1. In a mixing box for distributing conditioned air to a zone of a building to be conditioned, said mixing box having an air receiving chamber and an air mixing chamber; first and second conduit means for delivering separate cold and hot airstreams into said air-receiving chamber; thermostat means within zone for generating a control signal proportional to the temperature within said zone; proportioning valve means responsive to a range of control signals from said thermostat means for reciprocally blending said hot and cold airstreams to deliver a principal steam to said air-mixing chamber, said proportioning valve means being operable between a first extreme position wherein the flow of hot air is substantially terminated and essentially only cold air is delivered to said air-mixing chamber, and a second extreme position wherein the flow of cold air through said proportioning valve means is substantially terminated and essentially only hot air is delivered to said air-mixing chamber; first flow control means disposed between said proportioning valve means and said air mixing chamber for maintaining the first flow rate of said principal stream essentially constant; and discharge conduit means for conveying a conditioning stream from said air-mixing chamber to said zone; the improvement comprising:
  second valve responsive to a second range of control signals which includes signals beyond the first said range, for delivering a supplementary stream of cold air to said air-mixing chamber, said second valve means being operable when said proportioning valve means is in said first extreme position and delivers essentially only cold air; and
  second flow control means disposed between said second valve means and said air-mixing chamber for limiting the flow rate of said supplementary stream of cold air to a selected value,
  whereby over the first range of control signals, said proportioning valve means and said first flow control means cooperate to provide variable temperature/constant volume operation of said mixing box, and over said second range of control signals, said proportioning valve means, said first flow control means, said second valve means, and said second flow control means cooperate to provide constant temperature/variable volume operation of said mixing box.

2. The improvement of claim 1 wherein the first said range of control signals overlaps said second range of control signals.

3. The improvement of claim 1 wherein the first said range of control signals is distinct from said second range of control signals.

4. The improvement of claim 1 wherein the control signals comprise pneumatic pressures.

5. The improvement of claim 1 wherein over said first range of control signals, said second valve means is closed, whereby the flow rate of supplementary air through said second flow control means is essentially zero.

6. In a mixing box for distributing conditioned air to a zone of a building to be conditioned, said mixing box including first and second conduit means for delivering separate streams of cold air and hot air to said mixing box, an air-mixing chamber with discharge duct means for delivering a conditioning stream to said zone, the improvement comprising:
  a first compartment having one inlet communicating with said first conduit means and two first compartment outlets;
  a second compartment having one inlet communicating with said second conduit means and one second compartment outlet;
  first valve means for reciprocally blending the airstreams from one of said first compartment outlets and said second compartments outlet and delivering a principal stream of (a) only hot air, (b) a mixture of cold air and hot air, or (c) only cold air, to said air-mixing chamber;
  first flow control means for maintaining the flow rate of said principal stream essentially constant;
  second valve means associated with the other of said first compartment outlets and operable only when said first valve means delivers only cold air, for delivering a supplementary stream of cold air to said air-mixing chamber; and
  second flow control means for limiting the flow rate of said supplementary stream of cold air to a selected value,
  whereby said first valve means and said first flow control means cooperate to provide variable temperature/constant volume operation of said mixing box, and
  wherein said first vale means, said first flow control means, said second valve means and said second flow control means cooperate to provide constant temperature/variable volume operation of said mixing box.

7. The improvement of claim 6 wherein said second valve means is closed and the flow rate of said supplementary stream of cold air is essentially zero during variable temperature/constant volume operation of said mixing box.

* * * * *